United States Patent [19]

Stevens

[11] Patent Number: 4,763,621
[45] Date of Patent: Aug. 16, 1988

[54] AUTOMATICALLY FUNCTIONING EMERGENCY FUEL SUPPLY SYSTEM FOR INTERNAL COMBUSTION ENGINE

[76] Inventor: Walter J. Stevens, 52 Orange Tree Cir., W., Winter Garden, Fla. 32787

[21] Appl. No.: 881,058

[22] Filed: Jul. 1, 1986

[51] Int. Cl.⁴ .......................................... F02M 39/00
[52] U.S. Cl. ................................. 123/198 D; 123/514; 137/263; 417/36
[58] Field of Search .................. 123/514, 198 D, 510, 123/511; 261/18; 137/263, 567; 417/35, 36, 40

[56] References Cited

U.S. PATENT DOCUMENTS

| | | | |
|---|---|---|---|
| 944,811 | 12/1909 | Hageborn | 123/198 D |
| 973,880 | 10/1910 | Ranney | 123/198 D |
| 2,136,079 | 8/1938 | Haskins | 123/198 D |
| 2,311,828 | 2/1949 | Hasen | 123/198 D |
| 2,549,409 | 4/1951 | Aktinson | 137/263 |
| 2,574,321 | 11/1951 | Duncan | 123/198 D |
| 3,148,670 | 9/1964 | Fiedler | 123/198 D |
| 3,534,721 | 10/1970 | King | 123/517 |
| 3,982,516 | 9/1976 | Abernathy | 123/198 D |
| 4,075,996 | 2/1978 | Hisserich | 123/198 D |
| 4,306,579 | 12/1981 | Kelly | 137/263 |
| 4,346,689 | 8/1982 | Neely | 123/198 D |
| 4,403,589 | 9/1983 | Bowen | 123/198 D |
| 4,437,811 | 3/1984 | Iwata | 447/36 |
| 4,485,788 | 12/1984 | Hofbauer | 123/511 |
| 4,570,604 | 2/1986 | Thornton | 123/514 |

FOREIGN PATENT DOCUMENTS 462720  1/1950  Canada .................................. 417/40

Primary Examiner—Carl Stuart Miller
Attorney, Agent, or Firm—Julian C. Renfro

[57] ABSTRACT

The invention includes a fuel tank containing an emergency supply of fuel for an internal combustion engine in the general proximity of the engine, with the arrangement being such that proper communication from this alternate source of fuel directly to the air-fuel mixer of the engine is effected. The preferred example of the air-fuel mixer is a carburetor. In this way, by utilizing a reliable arrangement for the delivery of fuel directly to the carburetor, a temporary problem with the primary fuel supply can be circumvented.

14 Claims, 1 Drawing Sheet

AUTOMATICALLY FUNCTIONING EMERGENCY FUEL SUPPLY SYSTEM FOR INTERNAL COMBUSTION ENGINE

BACKGROUND OF THE INVENTION

In the past many attempts have been made to provide a truly dependable emergency fuel supply for internal combustion engines, such as are used in automobiles, trucks, buses, and other road vehicles.

Many of these prior art devices involved the use of an additional fuel tank, such that if the main fuel tank became empty as a result of all of the fuel having been consumed, from the fuel tank having been punctured, or the like, a switchover could be effected either manually or automatically such that a sufficient amount of fuel was provided from the additional fuel tank to the fuel-air mixer of the engine in order to keep the engine running.

It has also been known to provide an additional fuel tank for extended travel requirements or for emergency road use, as well as in other instances to provide a second fuel tank employing a relatively small quantity of premium quality fuel usable for starting an engine. In very cold weather, for example, this premium fuel could be used for starting the engine, with switchover to less expensive fuel being accomplished at such time as the engine has warmed up.

An important shortcoming of all of these earlier systems involved the fact that should the carburetor ice up, the fuel pump fail, the fuel line to the carburetor become clogged, or some other misfortune befall one or more of the principal components of the fuel system, the conventional auxiliary fuel arrangement was unable to overcome the problem, and to keep the engine running.

It was in an effort to overcome the shortcomings of these and other such prior art devices and systems that this invention was evolved.

SUMMARY OF THE INVENTION

In accordance with this invention, a fuel tank containing an emergency supply of fuel for an internal combustion engine is provided in the general proximity of the engine, with means being arranged such that proper communication from this alternate source of fuel directly to the fuel-air mixer of the engine is effected. The most typical example of the fuel-air mixer is of course the carburetor. In this way, by arranging a reliable means for the delivery of fuel directly to the carburetor, a temporary problem with the primary fuel supply can be circumvented.

Inasmuch as under extenuating circumstances a sufficient quantity of fuel must continue to be provided to the fuel-air mixer in order to keep the engine running, I provide an automatically functioning pump means for delivering a predictable quantity of fuel per unit time from the alternate fuel source, along the specially provided communication means, to the fuel-air mixer of the engine. The pump means I prefer to use can be an electrical device, preferably powered from the battery used for starting the engine, although a special battery can be specifically provided for this purpose.

Importantly, activation of the pump energizing means causes, in accordance with this invention, fuel to be delivered directly to the engine, irrespective of the failure of the primary fuel supply of the engine, or the inability of sufficient fuel to reach the carburetor or other fuel-air mixer of the internal combustion engine due to low temperature operating conditions.

As a result of the automatically functioning emergency fuel supply in accordance with this invention, a motor vehicle equipped with my novel system can be driven for a number of miles after the primary fuel system of the motor vehicle has for any reason become disabled.

As should be clear, because my emergency fuel system when used in a motor vehicle is entirely separate from the customary fuel system of the vehicle, my invention makes it possible for the engine of the vehicle to start under low temperature conditions, or for a fuel-deprived engine to revive so that the operator can drive the motor vehicle for a sufficient distance as to reach a position of safety.

It is therefore a principal object of my invention to provide a low cost emergency fuel delivery system such that fuel can be supplied automatically for the operation of an internal combustion engine despite the fact that the primary fuel system of the engine has failed to function properly.

It is another object of this invention to provide an automatically functioning emergency fuel system for assuring the safety of the people in a motor vehicle in which the primary fuel system has for any reason failed, in that it enables an appropriate amount of fuel to be delivered directly to the fuel-air mixer of the engine, such that the engine can be operated continuously for a number of miles.

It is yet another object of this invention to provide an emergency fuel system of low cost and great dependability, which can be readily installed, and reused as many times as necessary.

It is yet still another object of my invention to provide in a motor vehicle, a novel combination of fuel-supplying components that can cooperate together reliably, effectively and rapidly should the primary fuel supply of the motor vehicle fail while the vehicle is in a position of possible danger.

It is yet another object of this invention to provide a novel, highly effective emergency fuel system for an engine, which is automatically operable so as to function in a manner appropriate for the particular circumstances at hand, with no intervention by the driver being necessary.

These and other objects, features and advantages will be more apparent from a study of the drawings and significant features of this invention.

DETAILED DESCRIPTION

Figure 1:
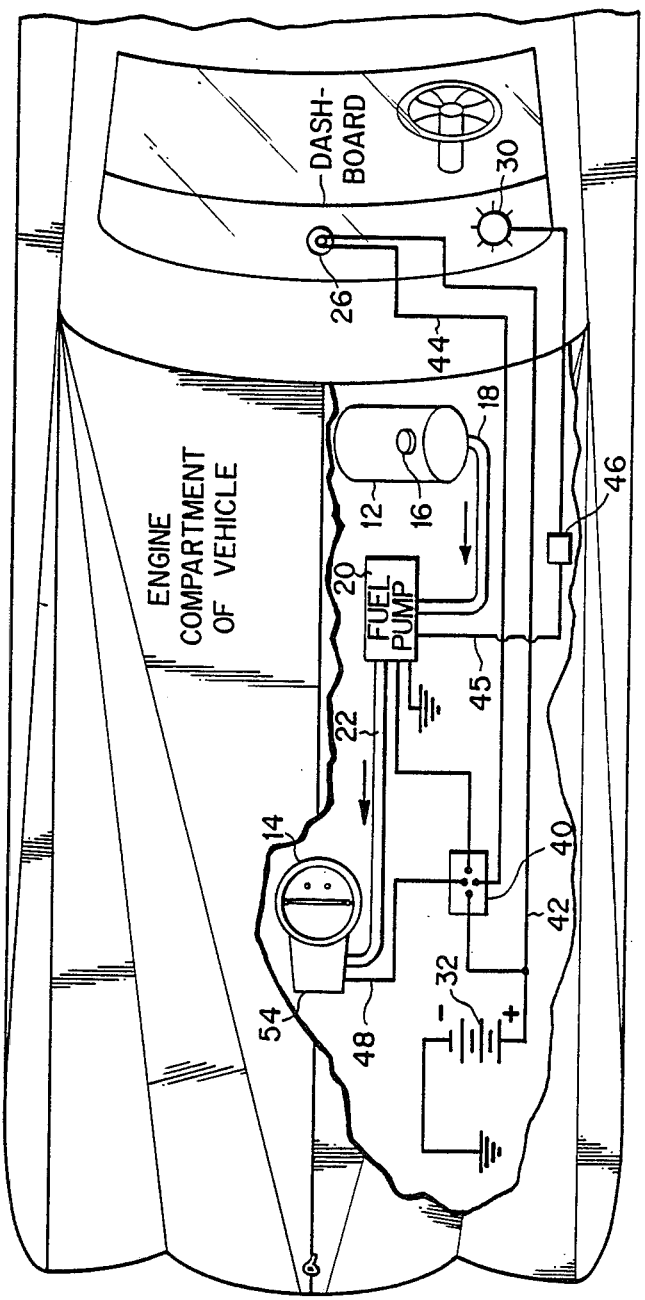
FIG. 1 is a schematic view of a typical emergency fuel system in accordance with this invention, which is to be regarded as separate from the primary fuel system of the motor vehicle.

With reference to FIG. 1, it will be seen that I have depicted an emergency fuel system 10, including an emergency fuel tank 12 that is mounted in the general vicinity of the fuel-air mixer 14 of an internal combustion engine. Such engine could be used for supplying propulsion to a motor vehicle, for example. In this figure, neither engine nor vehicle need to be shown, for the invention is limited to my automatically functioning emergency fuel system.

Inasmuch as the alternate source of fuel in accordance with this embodiment of my invention is not intended to supply fuel to the engine for a protracted length of time, the emergency fuel tank 12 can be considerably smaller than the tank primarily used for supplying the engine with fuel, and by way of example, the tank 12 can contain 32 fluid ounces, although I am not to be limited to this.

The emergency fuel tank 12, which typically will be filled with high octane (premium) gasoline, or gasoline mixed with alcohol or other suitable fuel additive, can be mounted in any of a number of suitable places in or about the motor vehicle, such as on the firewall of the engine compartment. Because I typically fill the auxiliary tank 12 with high octane fuel, it often can bring about the starting of an engine under very cold conditions.

A fill port 16 is provided on the upper portion of the auxiliary tank 12, so that the tank can be refilled as needed with fuel of a quality and type such that the engine can continue to run in the event of primary fuel line failure, and/or be dependably restarted in an emergency situation or in cold weather conditions. Leading away from a lower portion of the tank 12 is a fuel line 18 connected to an electrically powered fuel pump 20 provided in accordance with this invention, with a fuel line 22 being connected to provide suitable communication for fuel from the pump 20 to flow to the fuel-air mixer 14 utilized with the engine. Typically the device 14 is a carburetor, but it is to be realized that my invention can be used in connection with an engine having fuel injection means as the fuel-air mixer, instead of a carburetor.

As should be clear, I dispose the electrically powered pump means 20 at an appropriate location in the fuel line providing communication from the tank 12 to the fuel-air mixer 14, so that upon the closing of certain electric switches installed in a series relation as hereinafter discussed, fuel will be dependably supplied to the fuel-air mixer 14 in quantities appropriate for the operation for the engine should there be an insufficiency of fuel, or a complete cutoff of the fuel supplied to the fuel-air mixer from the principal fuel system. The inability of the principal fuel system of the motor vehicle to keep the engine running could of course be occasioned by the principal fuel tank becoming empty; the principal fuel pump failing, the fuel line filter becoming clogged or leaky; or the like.

Continuing with FIG. 1, the outlet end 28 of the fuel line 22 provided in accordance with this invention preferably is connected to the housing of the fuel-air mixer 14 so as not to interfere with its normal operation, and in the event of the fuel-air mixer being a carburetor, I arrange for the emergency fuel from pump 20 to be supplied to the float chamber of the carburetor.

As illustrated in FIG. 1, I prefer to provide a light 30 on the dashboard of the motor vehicle, which is illuminated at the time the electrically powered fuel pump 20 in accordance with this invention is energized. In this way the operator of the motor vehicle can be made closely aware of any instance in which the emergency fuel system is in operation. The light 30 can be caused to be illuminated intermittently by its use in connection with a flasher unit 46.

The emergency fuel pump 20 exclusively receives its electric power from the battery 32 through a contactor 40 that can be energized only at such time as the ignition switch 26 located on the dashboard has been turned on, and a low fuel condition exists. Like most conventional ignition switches, switch 26 has a plurality of terminals thereon, from which certain appliances about the vehicle can be supplied with electric current (typically at 12 volts) when the operator has turned on the ignition switch. One such example is an automobile air conditioner, which is almost always completely non operational except at such times as the driver has turned the ignition switch to the "on" position. As a consequence of the arrangement I prefer, the operation of the emergency fuel pump 20 cannot occur unless the pump energizing means including the ignition switch 26 has been moved to the "on" position, and a low fuel level condition at the fuel-air mixer has been sensed by an electrical switch 64 installed in series with the ignition switch 26.

More specifically, electric power is supplied to the motor of the emergency fuel pump 20 only at such time as the electrically operated contactor 40 has been energized by the operator's closure of the ignition switch 26, to bring about closure of certain associated electrical contacts or relays. The electrical contactor 40 can for example be a type of solenoid device which, when energized, can function to bring about closure of main contacts (not shown) that will bring about the flow of electric current to the motor of the emergency fuel pump 20, to cause the commencement of its operation. It is important to note, however, that this flow of current through the pump 20 can take place only at such time as the position responsive switch 64 illustrated in FIG. 2 has been caused by close by the low fuel condition in the float chamber 54 of the carburetor. The closure of switch 64 brings about the completion of the electrical circuit through the coil or winding on the contactor 40 by providing a lead 48 through which a connection to ground is made. Note FIG. 2 in this regard.

So that the operator will at all times be aware that he or she is bringing about the pumping of fuel from the emergency fuel tank 12 to the fuel-air mixer 14, I run an electric line 45 from a suitable terminal of my device, such as the terminal from which electric power is delivered from the solenoid 40 to the fuel pump 20, with the other end of the line 45 being connected to a flasher 46. The flasher is in turn connected to the light 30 preferably located on the dashboard of the vehicle to indicate that the emergency fuel pump is in operation as a result of the switch 64 indicating a low fuel condition at the fuel air mixer 14 during the time of closure of the ignition switch 26. Other details will shortly be furnished.

It is thus to be noted that a direct electrical connection is not provided between the battery 32 and the electric fuel pump 20 used in accordance with this invention, but rather the electrical contactor 40 is interposed in this electrical line to prevent emergency fuel pump operation in response to signal of low fuel except at such time as the ignition switch of the engine has been turned to the "on" position. In other words, the electrical contactor or solenoid 40 is energized to bring about operation of pump 20 and the pumping of fuel from the emergency fuel tank 12 to the fuel-air mixer 14 only at such time as the customary ignition switch 26 is in the "engine operating" position, and the float operated switch 64 indicates a low fuel position.

As will be noted from FIG. 1, the ignition switch 26 associated with the engine is connected to the terminal of the battery 32 by an electric lead 42, and when this switch is closed, and the position responsive switch 64 is caused by the low position of the float 60 in the carburetor bowl 54 to close, a flow of current to the electric fuel pump can take place.

Figure 2:
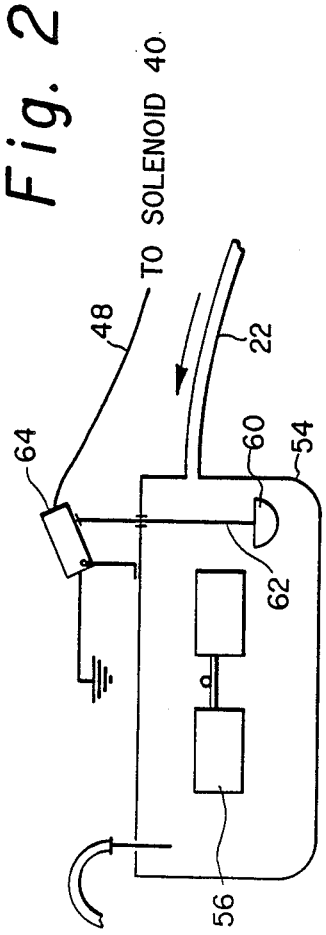
FIG. 2 is a cutaway view of a carburetor float chamber, revealing the use therein of an additional float provided in accordance with this invention, and a switch operated thereby.

With further regard to FIG. 2, it will be seen that I have shown an arrangement used when the automobile engine is fitted with a carburetor to serve as the fuel-air mixer 14. In this instance I have shown a carburetor bowl or float chamber 54 in cross section, in which is disposed a state of the art float unit 56. The float unit 56 is responsive in a well known manner to the level of fuel that is contained at a given moment in the bowl 54 of the carburetor, and its functioning in conjunction with its linkage serves to bring about a desirable limiting of the fuel from the engine's principal fuel pump (not shown), to prevent an undesirable occurrence, such as the overflowing of the bowl 54, and/or the flooding of the engine with fuel.

In accordance with the instant invention, I provide as an addition to the foregoing prior art arrangement, a further float 60 in the carburetor bowl 54, which device 60 is designed to float upon the surface of the fuel in the carburetor bowl 54. The device 60 is preferably connected by a rod 62 or other form of linkage, to a position responsive switch 64, such as a mercury switch. When switch 64 is in one position or attitude, it will not pass electric current, but when it is in another position or attitude, it will pass current. The switch 64 is thus pivotally mounted and preferably electrically interposed between electrical ground and the solenoid operated contactor 40, such that the circuit through the contacts of the solenoid that causes operation of the pump 20 cannot be completed when the switch 64 senses, through the action of the float 60, a high fuel level in the float chamber 54 of the carburetor. In other words, the switch 64 is arranged to disable the solenoid 40 electirically, and prevent it from bringing about the operation of the electric fuel pump 20 at such time as it would be inappropriate for the pump 20 to be supplying additional fuel to the carburetor.

As should now be clear, upon the float 60 sensing a low level of fuel in the bowl 54, it permits closing of the circuit, preferably a ground circuit, to the solenoid operated contactor 40, so that the electrical device 40 can activate to close the electric circuit to the pump means 20, and thereby cause the pump to deliver fuel from the tank 12 as long as the ignition switch 26 of the engine is in the closed position, such as when the engine is running. On the other hand, if the float 60 senses ample fuel in the bowl 54, it causes the mercury switch 64 to move or tilt into its circuit breaking position, so that the contactor 40 can no longer function to bring about operation of the emergency fuel pump 20.

I am not to be limited to the use of the additional float in the float chamber of the carburetor for apprising the auxiliary fuel system of this invention that ample fuel resides in the float chamber, and another suitable arrangement for accomplishing this purpose can of course be substituted.

As should now be clear, fuel is pumped automatically and continuously by the pump 20 to the fuel-air mixer 14 of the engine at the time of primary fuel line failure, so that the vehicle can be driven to the next filling station, for example, without operator intervention.

As to the operation of my emergency fuel device, should the engine falter or stop for any reason of insufficiency of the principal fuel supply, such as an empty main tank, clogged fuel line, or the like, my novel emergency fuel supply automatically comes into operation, without operator intervention. As previously indicated, the driver of the automobile is apprised of the operation of the emergency fuel system by a light 30 on the dashboard becoming illuminated, preferably in an intermittent manner, at such time as the electric fuel pump commences operation. As a result of my automatically functioning emergency fuel system, the engine will dependably operate in the instance of a low fuel supply in the principal fuel tank, so that the vehicle can be driven off of the railroad tracks or other location of peril, or to a nearby filling station for replenishment of fuel in the main fuel tank in the event the main tank has run dry.

My invention can be utilized either as original equipment, added to the motor vehicle at the factory, or as an add-on, to be installed by the motorist or his or her mechanic, to an existing arrangement. The emergency fuel system in accordance with my invention is particularly suited for use by a driver who is not mechanically inclined, for he or she need take no active step in causing my emergency fuel system to operate at the time the primary fuel system falters.

I claim:

1. An emergency fuel system for supplying fuel under adverse conditions to an internal combustion engine utilizing a carburetor, which may include a temporary or a permanent problem with the primary source of fuel for the engine, comprising:
   a. means for providing an alternate source of fuel for the engine, separate from the primary fuel source,
   b. communication means for providing communication for fuel from said alternate source of fuel to the carburetor of the engine,
   c. pump means for delivering a predictable quantity of fuel from said alternate source of fuel along said communication means to said carburetor of the engine, and
   d. pump energizing means activated by a low fuel supply at said carburetor, for automatically bringing about operation of said pump means, thus to cause it to supply fuel from said alternate source to enable engine operation on the occasion of an insufficient fuel supply from the primary source of fuel for the engine.

2. The emergency fuel system as recited in claim 1 in which said alternate source of fuel is a tank located adjacent to said engine.

3. The emergency fuel system as recited in claim 1 in which said pump means is an electrically powered pump.

4. The emergency fuel system as recited in claim 3 in which said pump energizing means includes an electric switch located adjacent the fuel-air mixer of the engine, which switch is operated to the circuit closing position on the occasion of an insufficient primary fuel supply.

5. The emergency fuel system as recited in claim 4 in which said electric switch is pivotally mounted, and prvented from closing the circuit through said electric fuel pump except at the time of sensing a low fuel level at the fuel-air mixer of the engine.

6. The emergency fuel system as recited in claim 4 in which said pump energizing means also includes the ignition switch of the engine interposed in the circuit of said pump means.

7. The emergency fuel system as recited in claim 1 in which fuel from said alternate source is delivered to the float chamber of said carburetor.

8. An emergency fuel system for supplying fuel under emergency conditions to the carburetor of an internal combustion engine of a motor vehicle which may include a depletion of fuel in the primary fuel supply for the engine, comprising:
   a. means providing an alternate source of fuel for the engine,
   b. a fuel line serving to provide communication from said alternate source of fuel to the carburetor of the engine,
   c. battery powered electric pump means for delivering a predictable quantity of fuel from said alternate source of fuel along said fuel line to said carburetor of the engine, and
   d. pump energizing means entailing the use of electric switch means, one of said switch means being prevented from moving to the position corresponding to the completion of the electric circuit through said pump means except in the circumstances of a low fuel level at said carburetor.

9. The emergency fuel system as recited in claim 8 in which said alternate source of fuel is a tank located on the firewall of the engine compartment of a motor vehicle in which the engine is located.

10. The emergency fuel system as recited in claim 8 in which another electric switch of said switch means is used in the circuit of said pump energizing means, said other switch being the ignition switch located on the dashboard of a motor vehicle in which said emergency fuel system is contained, latter switch being required to be in the "on" position in order for said pump means to operate.

11. An emergency fuel system for supplying fuel to the carburetor to an internal combustion engine of a motor vehicle under emergency conditions, which may include a temporary or a long term difficulty with the primary fuel supply for the engine, comprising:
   a. means providing an alternate source of fuel for the engine,
   b. a fuel line serving to provide communication from said alternate source of fuel to the carburetor of the engine,
   c. battery powered electrical pump means for delivering a predictable quantity of fuel from said alternate source of fuel along said fuel line to said carburetor of the engine, and
   d. automatically functioning pump energizing means for enabling operation of the engine under emergency conditions by activating said electrical pump means to provide fuel to the carburetor of the engine, during the period of difficulty with the primary fuel supply for the engine,
   e. said pump energizing means being configured and arranged to be operational only at times of low fuel level at the carburetor of the engine.

12. The emergency fuel system as recited in claim 11 in which said pump energizing means includes two separate electrical switches interposed in series in the electrical line serving to deliver electrical power to said battery powered pump, one of said electrical switches being a switch to sense low fuel level at the carburetor, and the othere being the ignition switch of the engine.

13. The emergency fuel system as recited in claim 12 in which said one switch is pivotally mounted adjacent the float chamber of said carburetor, which switch is moved into a circuit breaking position at such time as said float chamber contains a sufficient quantity of fuel.

14. The emergency fuel system as recited in claim 12 in which said one switch is pivotally mounted adjacent the float chamber of said carburetor, a float disposed in said float chamber, said float being connected to control the pivoting of said pivotally mounted switch in accordance with the fuel level in said float chamber, said switch being moved into a circuit breaking position at such time as said float chamber contains a sufficient quantity of fuel.

* * * * *